April 21, 1959  F. W. STILLO  2,882,885
APPARATUS FOR STARTING DIESEL ENGINES
Filed Oct. 2, 1956  4 Sheets-Sheet 1
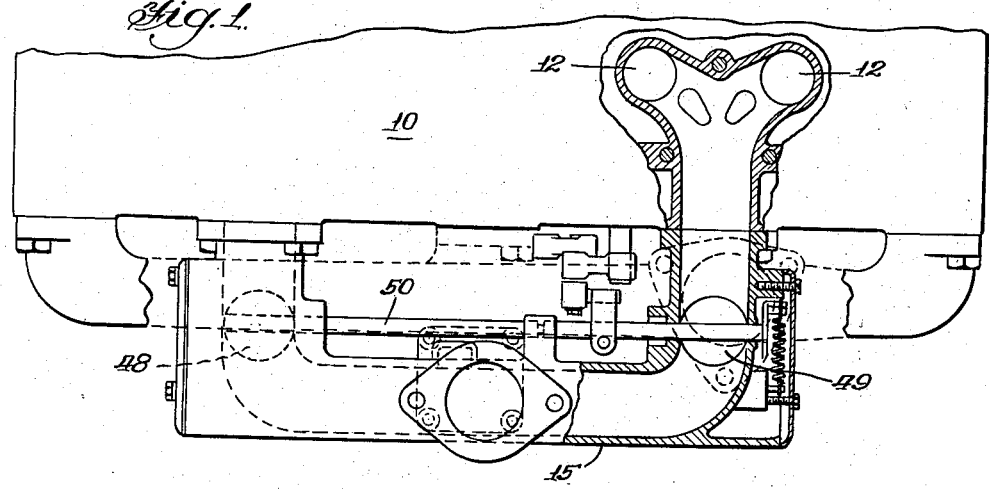
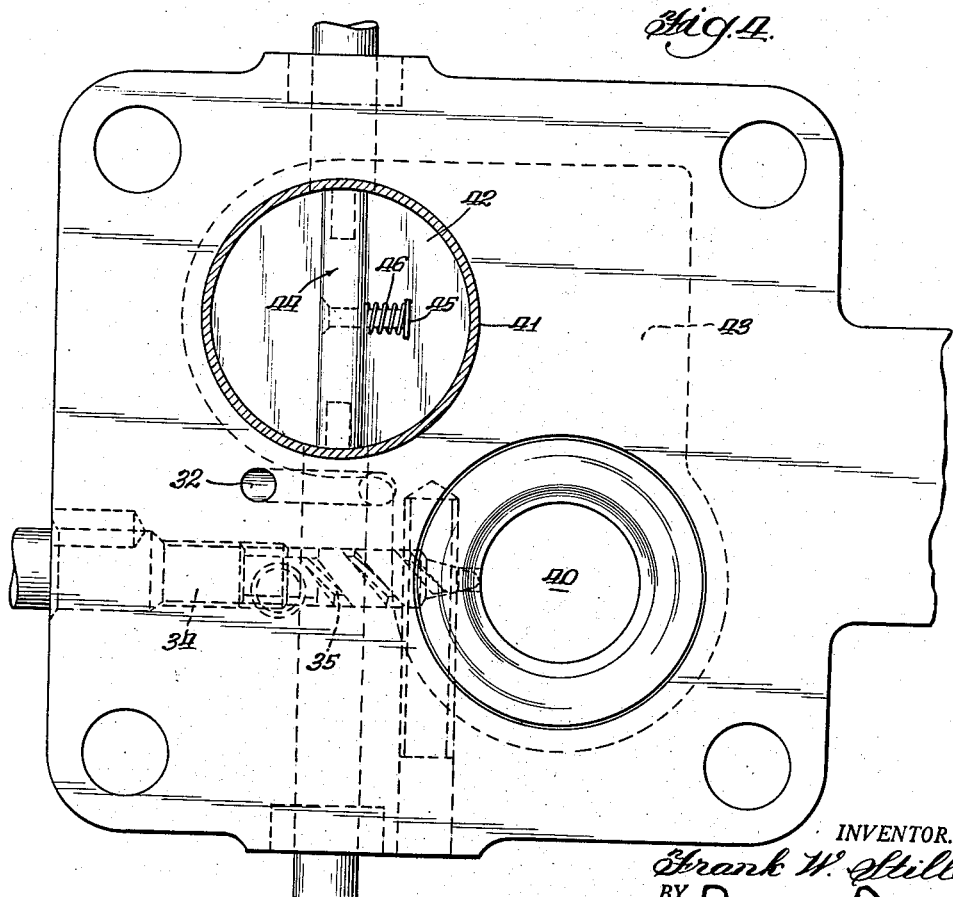
INVENTOR.
Frank W. Stillo
BY Paul O. Pippel
Atty.

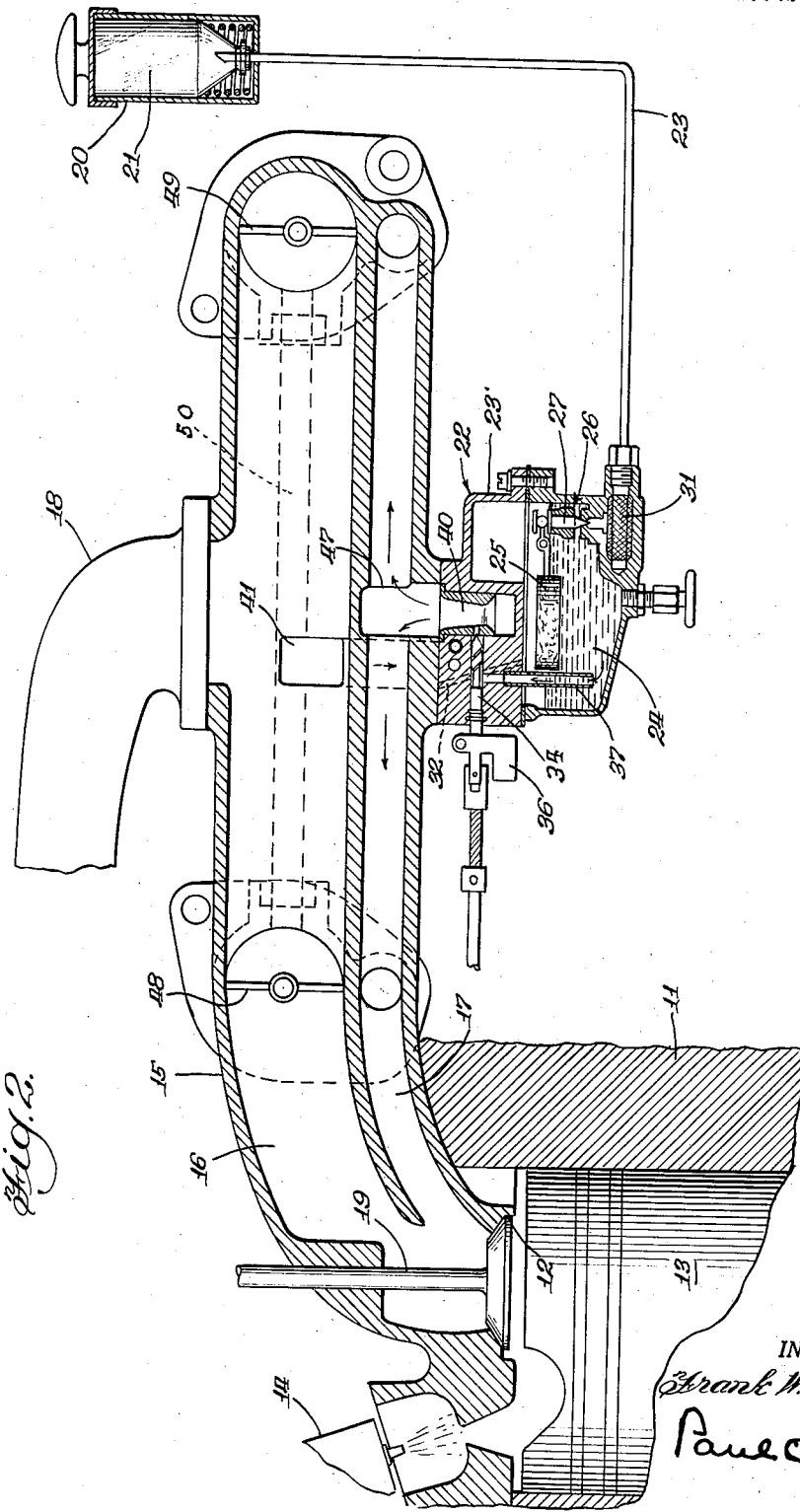

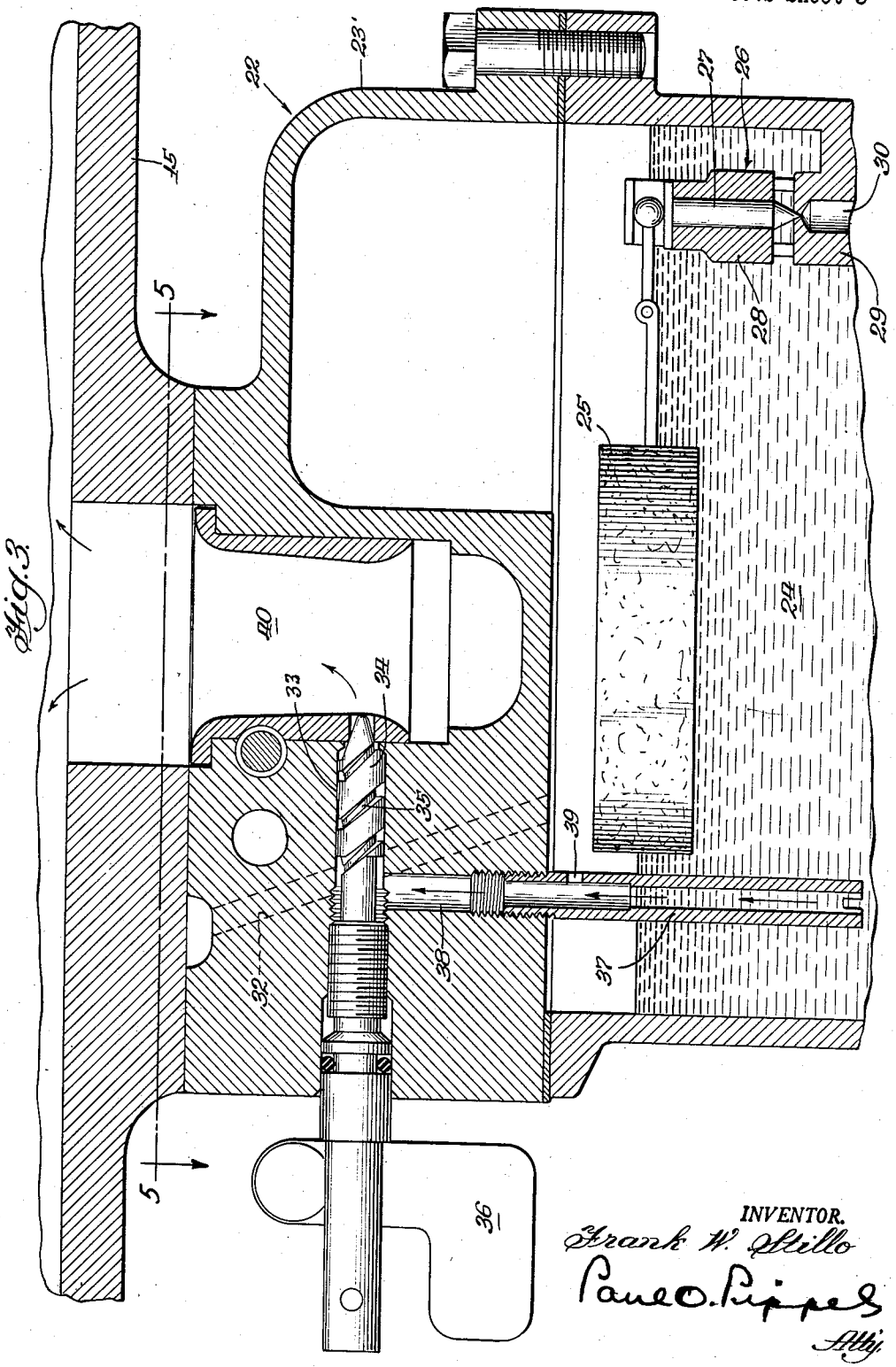

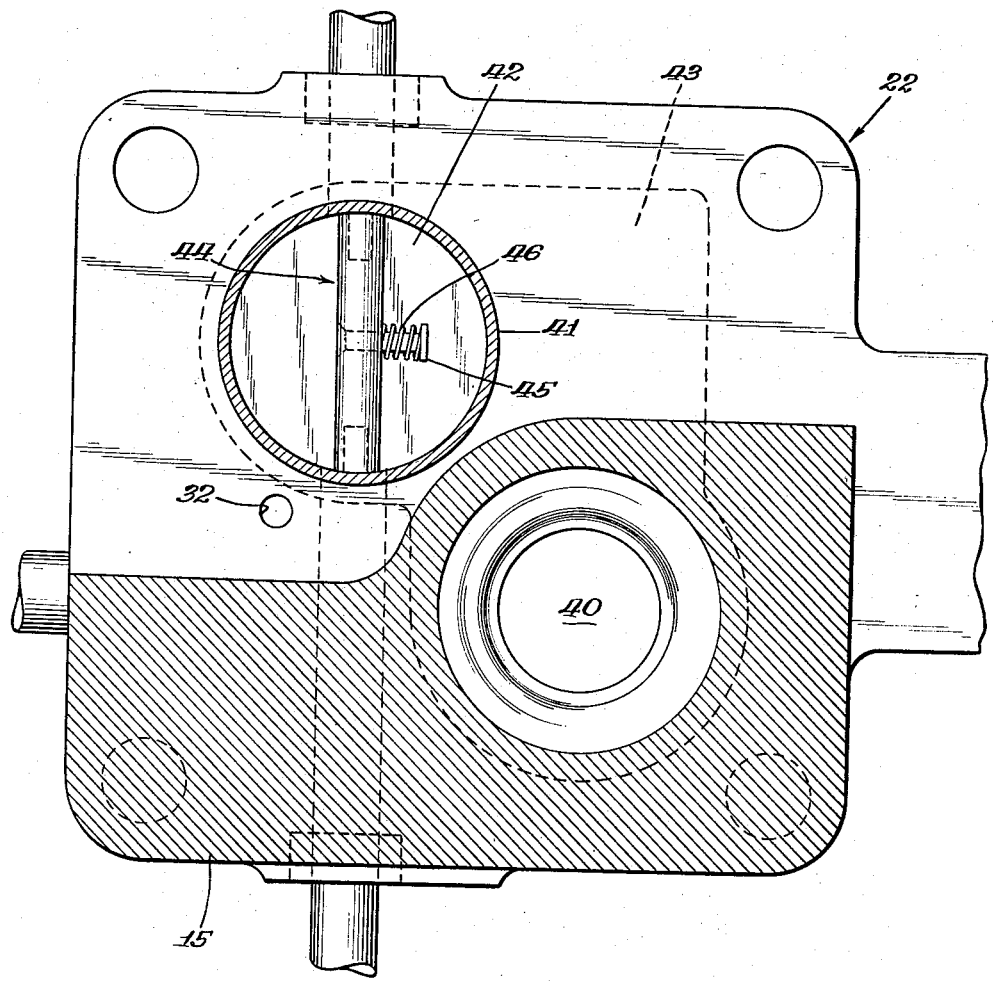

United States Patent Office 2,882,885
Patented Apr. 21, 1959

2,882,885

APPARATUS FOR STARTING DIESEL ENGINES

Frank W. Stillo, Chicago, Ill., assignor to International Harvester Company, a corporation of New Jersey Application October 2, 1956, Serial No. 613,432

6 Claims. (Cl. 123—180)

This invention relates to apparatus for starting diesel engines.

The object of the invention is to provide an apparatus which will give better mixing of starting fluid and air so as to enable easy starting of a diesel engine.

The foregoing and other objects of the invention will be apparent from the construction and arrangement illustrated in the accompanying drawings wherein:

Figure 1 is a plan view of a manifold structure as mounted on an engine, a portion of the structure being broken away to illustrate certain passages therein;

Figure 2 is a sectional view through the manifold structure and the charge forming device and the fluid container and a fragmentary view of a cylinder and a piston;

Figure 3 is an enlarged fragmentary view of the charge forming device and a portion of the manifold as seen in Figure 2;

Figure 4 is a top plan view of the charge forming device with an air pipe leading to the device being shown in section; and Figure 5 is a partly plan and partly plan sectional view taken on the line 5—5 of Figure 3 showing portions of the charge forming device and intake manifold respectively.

In the past great difficulty has been encountered in starting diesel engines at low temperatures. Various devices for starting diesel engines at low temperatures have been designed but none have proved to be both successful and practical. The invention proposes apparatus for starting diesel engines at low temperatures. The apparatus is comprised of a container having highly volatile fluid therein and a charge forming device is in communication with the container. The charge forming device has a first means for mixing fluid and air and also has a second means for mixing fluid and air and the fluid and air after being mixed in the first means passes through the second means where new air is added to the existing fluid and air mixture. The resulting mixture then flows into the cylinder where it is ignited to start the engine. This apparatus provides a better mixing of the fluid and air so that the volatile mixture will not be too rich. If the mixture is too rich the engine will not start and if the mixture is too lean the engine will not start. This apparatus gives a proper mixing of starting fluid and air so as to enable easy starting of a diesel engine.

In the drawings, 10 designates the block of a four cycle diesel engine having four cylinders 11 and each cylinder has an opening 12 in one end and a piston 13 is disposed in each cylinder. Each cylinder 11 has a diesel fuel injection nozzle 14 mounted in the end thereof and a fuel injection pump is operatively connected to the nozzle and the fuel injection pump is operatively connected to the engine crankshaft and a governor is provided for controlling the amount of fuel injected into the cylinder by the nozzle. An intake manifold 15 has its ends disposed over the openings in the cylinders 11 and is secured to the cylinders and the manifold has passages 16 and 17 and these passages merge at the ends of the manifold.

A pipe 18 is disposed centrally of the manifold and is secured thereto and is open to the atmosphere so that air can flow through the pipe into passage 16. An intake valve 19 is disposed in the opening in the cylinder 11 and is connected to a camshaft connected to the engine crankshaft. The passage 16 is the source of intake air when operating on diesel fuel. The exhaust valve is not shown, but is located behind the intake valve 19 in Figure 2.

The apparatus for starting the diesel engine is comprised of a container 20 having a cap threaded thereon and a sealed container 21 disposed in the container 20. The container 21 contains a highly volatile fluid such as ether. A charge forming device 22 is provided and a tube 23 connects the charge forming device to the container 20. One end of the tube 23 is formed so as to provide a sharp point to pierce the container 21 and let liquid ether flow through the tube into the charge forming device 22. The container 20 is disposed above the charge forming device 22 so that there will be a gravity feed of fluid from the container to the charge forming device. The charge forming device 22 includes a housing 23' provided with a fluid chamber 24 and a float 25 is disposed in the fluid chamber and is pivotally mounted in the housing. A shut-off valve 26 has a plunger 27 mounted on the end of the float arm and slidable in a stationary guide 28 fixed on structure 29 integral with the housing 23 and having an opening 30 therein communicating with the tube 23 and a strainer 31 is mounted in this opening. Upon the fluid in the fluid chamber 24 reaching a predetermined level the float moves the plunger 27 into the opening 30 to shut off the flow of fluid from the container 21 to the fluid chamber. The housing 23 is provided with a slanting hole 32 in communication with the atmosphere and in communication with the fluid chamber 24. The housing 23' is also provided with an opening 33 extending horizontally inwardly from the outside surface thereof and terminating intermediate the outside surfaces of the housing. A valve member 34 has threads thereon which are in engagement with threads in the opening 33 and the member has a helical groove 35 therein. The valve member 34 projects beyond the housing to the dashboard of the vehicle in which the diesel engine is mounted. The valve member 34 has a hand grip 36 thereon for turning the member when the diesel engine is used as a stationary engine. A conduit 37 is disposed in the fluid in the fluid chamber 24 and fits tightly in an opening 38 in the housing 23' which merges with the opening 33. The conduit 37 is provided with an aperture 39 in communication with the fluid chamber 24. The housing 23' is provided with an enlarged passage or venturi 40 in communication with the opening 33 in the housing. A pipe 41 is secured to the intake manifold 15 and is in communication with the passage 16 of the manifold. The pipe 41 is disposed over an opening 42 in the charge forming device and is secured to the charge forming device and a passage 43 from this opening merges with the venturi 40. A manually operated choke 44 is in the form of a flat circular plate and this plate is disposed in the opening 42 and is rotatably mounted in the housing. A poppet choke is mounted in the choke and is comprised of a valve member 45 made up of a shank and a disc integral with the shank and the valve member is slidably mounted in an opening in the flat plate and a coil spring 46 is disposed on the valve member and bears against the slightly enlarged end of the valve member and against the flat plate urging the disc of the valve member to a position closing the opening. A part 47 is cast integral with the intake manifold 15 and is disposed over the venturi 40 and has an opening therein in communication with the venturi and the passage 17. A butterfly valve 48 is disposed in the passage 16 in the intake manifold adjacent one pair of cylinders and a butterfly valve 49 is disposed in the same passage adjacent the other pair of cylinders. A rod 50 is secured to the butterfly valves 48 and 49 and a handle is connected to the rod for manually operating the butterfly valves.

The mode of operation for starting the diesel engine is as follows: The valve member 34 is partly unscrewed so that the opening 33 is in communication with the venturi 40. The choke 44 is then closed and the governor throttle is placed in the high idle position with the butterfly valves 48 and 49 in the intake manifold closed. A sealed container 21 of highly volatile starting fluid is placed in the container 20 and the cap screwed on the container 20 so that the container 21 is pierced by the end of tube 23. The liquid will flow by gravity to the fluid chamber 24 in the charge forming device until the fluid reaches the predetermined level in the fluid chamber where the shut-off valve 26 will shut off flow of fluid from the container 21 to the fluid chamber. While filling the fluid chamber 24 air will bleed out through the hole 32 in the housing of the charge forming device. The cranking motor starter switch is then actuated to cause rotation of the engine crankshaft. The difference between atmospheric pressure and the pressure in the cylinder on the suction stroke of the piston will cause the poppet valve 45 to open against the force of the spring 46 and will force the liquid through the conduit 37 where air from aperture 39 is bled with the fluid. This fluid air mixture, while under suction, will swirl around the groove 35 of the valve member 34. The fluid air mixture after passing around the groove 35 of the valve member 34 will be in the form of foam or bubbles. This fluid air mixture will then flow into the enlarged passage or venturi 40 and the difference between atmospheric pressure and cylinder pressure on the suction stroke of the piston will cause additional air to flow from pipe 18 into pipe 41 and through opening 42 into passage 43 and then into the venturi where it mixes with the fluid air mixture flowing through the venturi. The resulting mixture will be atomized upon leaving the enlarged passage or venturi 40. The resulting mixture flows into the passage 17 of the intake manifold and then through opening 12 into the cylinder. Diesel fuel has been injected into the cylinder by nozzle 14 since the starting of the cranking motor. The fluid air mixture will be ignited by compression in the cylinder but the diesel fuel will not be ignited. The reason for this is that ether ignites at 300° F. and diesel fuel ignites at 700° F. The diesel fuel will be moved out through the exhaust. After the first fire is obtained the choke is opened gradually allowing more air to enter the system. When the engine is firing on all cylinders, the butterfly valves 48 and 49 in the passage 16 of the intake manifold are opened to increase the volumetric efficiency on the diesel cycle. As soon as the butterfly valves 48 and 49 are opened the diesel fuel starts to ignite and the engine starts operating on diesel fuel. The choke 44 is then closed and the member 34 screwed inwardly of the housing to close off opening 33 from the venturi 40. This gives a sealed system in the fluid chamber 24 of the charge forming device to prevent highly volatile starting fluid from vaporizing or entering the engine.

It has been found by experiment that the apparatus of the present invention will start diesel engines at temperatures as low as −25° F. Apparatus has been provided in the past for starting diesel engines successfully, but this apparatus was so large that it would be difficult to mount it on a vehicle such as a tractor. If it was mounted on a vehicle it would project out so far from the vehicle that it would collide with other objects while the vehicle was in use and be damaged. This apparatus used in the past was not only large but it was also extremely difficult to operate. Applicant's apparatus is small enough so that it can be easily mounted on a vehicle such as a tractor and remain on the vehicle during the life of the vehicle and it is easy to operate.

What is claimed is:

1. Apparatus for starting a diesel engine having a cylinder provided with an opening in one end and a piston in the cylinder and an intake manifold secured to the cylinder and having a passage in communication with the opening in the cylinder and an intake valve disposed over the opening in the cylinder and operatively connected to the engine crankshaft, the apparatus comprising a container containing a highly volatile fluid, a charge forming device including a housing provided with a fluid chamber in communication with the interior of the container and a hole in communication with the fluid chamber and the atmosphere to provide air in the fluid chamber and an opening and a member having a helical groove therein disposed in the opening and a conduit disposed in the fluid in the fluid chamber and extending to the opening and the conduit being provided with an aperture in communication with the fluid chamber and the housing being provided with a venturi in communication with the opening in the housing and the atmosphere and the passage in the intake manifold, fluid from the fluid chamber and air flowing through the conduit around the helical grooves of the member where the fluid and air is mixed and air from the atmosphere flowing into the venturi being added to the mixture and the resulting mixture flowing into the passage and then into the cylinder where it is ignited to start the engine.

2. Apparatus for starting a diesel engine having a cylinder provided with an opening in one end and a piston in the cylinder and an intake manifold secured to the cylinder and having a passage in communication with the opening in the cylinder and an intake valve disposed over the opening in the cylinder and operatively connected to the engine crankshaft, the apparatus comprising a container containing a highly volatile fluid, a charge forming device including a housing provided with a fluid chamber in communication with the interior of the container and a float disposed in the fluid chamber and mounted in the housing and a shut-off valve disposed in the fluid chamber and engaging the float and the float actuating the shut-off valve to shut off the flow of fluid from the container to the fluid chamber upon the fluid reaching a predetermined level in the fluid chamber and the housing being provided with a hole in communication with the fluid chamber and the atmosphere to provide air in the fluid chamber and an opening and a member having a helical groove therein disposed in the opening and a conduit disposed in the fluid in the fluid chamber and extending to the opening and the conduit being provided with an aperture in communication with the fluid chamber and the housing being provided with a venturi in communication with the opening in the housing and the atmosphere and the passage in the intake manifold, fluid from the fluid chamber and air flowing through the conduit around the helical grooves of the member where the fluid and air is mixed and air from the atmosphere flowing into the venturi being added to the mixture and the resulting mixture flowing into the passage and then into the cylinder where it is ignited to start the engine.

3. Apparatus for starting a diesel engine having a cylinder provided with an opening in one end and a piston in the cylinder and means mounted on the cylinder for injecting diesel fuel into the cylinder and an intake manifold having a first passage in communication with the atmosphere and a second passage and the first and second passages merging at one end of the manifold and said one end of the manifold being disposed over the opening in and secured to the cylinder and an intake valve disposed over the opening in the cylinder and operatively connected to the engine crankshaft, the apparatus comprising a container containing a highly volatile fluid, a charge forming device including a housing provided with a fluid chamber in communication with the interior of the container and a float disposed in the fluid chamber and pivotally mounted in the housing and a shut-off valve disposed in the float chamber and engaging the float and shutting off the flow of fluid from the container to fluid chamber upon the fluid reaching a predetermined level in the fluid chamber and the housing being provided with a hole in communication with the fluid chamber and the atmosphere to provide air in the fluid chamber and an opening and a member having a helical groove therein disposed in the opening and a conduit disposed in the fluid in the fluid chamber and extending to the opening and the conduit being provided with an aperture in communication with the fluid chamber and the housing being provided with a venturi in communication with the opening in the housing and the first and second passages in the intake manifold, and a manually operated valve in the first passage, fluid from the fluid chamber and air flowing through the conduit around the helical grooves of the member where the fluid and air is mixed and air from the atmosphere flowing into the venturi being added to the mixture and the resulting mixture flowing into the second passage and into the cylinder and after the engine is firing the manually operated valve being opened so that air from the first passage will flow into the cylinder and the diesel fuel will be ignited so that the engine will start operating on diesel fuel.

4. Apparatus for starting a diesel engine having a cylinder provided with an opening at one end and a piston in the cylinder and an intake manifold secured to the cylinder and having a passage in communication with the opening in the cylinder, and an intake valve disposed over the opening in the cylinder and operatively connected to the engine crankshaft; the apparatus comprising a container containing a highly volatile fluid, a charge forming device including a housing having a fluid chamber, means providing for communication between said container and said chamber, said housing including a hole communicating with the fluid chamber and the atmosphere to provide air in the fluid chamber, said housing including an opening, a member movably disposed in the opening of said housing, said member having a helical groove disposed in the opening of said housing, a conduit disposed in said fluid chamber and communicating with the opening in said housing, said conduit having an aperture in communication with the fluid chamber, said housing having an enlarged passage in communication with the opening in the housing and the atmosphere and the passage in the intake manifold, whereby fluid from the fluid chamber and air flows through the conduit around the helical grooves of the member whereby the fluid and air is mixed and air from the atmosphere flowing into the enlarged passage being added to the mixture and the resultant mixture flows into the passage of the intake manifold and then into the cylinder where it is ignited to start the engine.

5. Apparatus for starting a diesel engine having a cylinder provided with an opening at one end and a piston in the cylinder and an intake manifold secured to the cylinder and having a passage in communication with the opening in the cylinder, and an intake valve disposed over the opening in the cylinder and operatively connected to the engine crankshaft; the apparatus comprising a charge forming device including a housing having a fluid chamber containing a volatile mixture, said housing including a hole communicating with the fluid chamber and the atmosphere to provide air in the fluid chamber, said housing including an opening, a member movably disposed in the opening of said housing, said member having a helical groove disposed in the opening of said housing, a conduit disposed in said fluid chamber and communicating with the opening in said housing, said conduit having an aperture in communication with the fluid chamber, said housing having a venturi in communication with the opening in the housing and the atmosphere and the passage in the intake manifold, whereby fluid from the fluid chamber and air flows through the conduit around the helical grooves of the member whereby the fluid and air is mixed and air from the atmosphere flowing into the venturi being added to the mixture and the resultant mixture flows into the passage of the intake manifold and then into the cylinder where it is ignited to start the engine.

6. Apparatus for starting a diesel engine having a cylinder provided with an opening at one end and a piston in the cylinder and an intake manifold secured to the cylinder and having a passage in communication with the opening in the cylinder, and an intake valve disposed over the opening in the cylinder and operatively connected to the engine crankshaft; the apparatus comprising a container containing a highly volatile fluid, a charge forming device including a housing having a fluid chamber, means providing for communication between said container and said chamber, said housing including a hole communicating with the fluid chamber and the atmosphere to provide air in the fluid chamber, said housing including an opening, a valve member movably disposed in the opening of said housing, a conduit disposed in said fluid chamber and communicating with the opening in said housing, said conduit having an aperture in communication with the fluid chamber, said housing having a venturi in communication with the opening in the housing, said valve member being movable to open and close said opening in the housing with respect to said venturi, said venturi also being in communication with the atmosphere and the passage in the intake manifold, whereby fluid from the fluid chamber and air flows through the conduit around the valve member whereby the fluid and air is mixed and air from the atmosphere flowing into the enlarged passage being added to the mixture and the resultant mixture flows into the passage of the intake manifold and then into the cylinder where it is ignited to start the engine.

References Cited in the file of this patent
UNITED STATES PATENTS

| 2,062,644 | Ensign | Dec. 1, 1936 |
| 2,283,370 | Jedrzykowski | May 19, 1942 |